United States Patent [19]

Tsutsui et al.

[11] Patent Number: 5,325,712
[45] Date of Patent: Jul. 5, 1994

[54] AIR FLOW METER

[75] Inventors: Mitsukuni Tsutsui, Naka; Shinya Igarashi, Katsuta; Minoru Takahashi, Mito, all of Japan

[73] Assignees: Hitachi, Ltd., Tokyo; Hitachi Automotive Engineering Co., Ltd., Katsuta, both of Japan

[21] Appl. No.: 140,813

[22] Filed: Oct. 21, 1993

Related U.S. Application Data

[63] Continuation of Ser. No. 795,200, Nov. 19, 1991, abandoned.

[30] Foreign Application Priority Data

Nov. 21, 1990 [JP] Japan .................................. 2-316892

[51] Int. Cl.⁵ .............................................. G01M 19/00
[52] U.S. Cl. ................................................... 73/118.2
[58] Field of Search .............. 73/118.2, 202.5, 204.22, 73/204.11–204.27

[56] References Cited

U.S. PATENT DOCUMENTS

| 2,859,617 | 11/1958 | Adams | 73/204.19 |
| 4,578,996 | 4/1986 | Abe et al. | 73/118.2 |
| 4,870,857 | 10/1989 | Smith | 73/118.2 |
| 4,887,577 | 12/1989 | Arai et al. | 73/118.2 |

Primary Examiner—Robert Raevis
Attorney, Agent, or Firm—Ladas & Parry

[57] ABSTRACT

An air flow meter has a body forming a main passage defining an intake air passage of an internal combustion engine. An auxiliary passage within the main passage has a longitudinal passage in the axial direction and at least one transverse passage in the radial direction of the main passage. The auxiliary passage is defined by a member having a radially directed portion connected to an internal wall of the main passage. A hollow space is provided in the radially directed portion to render the wall thickness of the radially directed portion substantially uniform. Additionally, the hollow space is separated from the longitudinal passage by an auxiliary member which, in a preferred embodiment, surrounds a heat sensitive resistor.

12 Claims, 5 Drawing Sheets

AIR FLOW METER

This is a continuation of copending application Ser. No. 07/795,200, filed on Nov. 19, 1991, now abandoned.

BACKGROUND OF THE INVENTION

1. Field of the Invention

This invention relates to an air flow meter for metering the flow rate of intake air of an internal combustion engine and, more particularly, to an air flow meter having a flow metering heat-sensitive resistor located in an auxiliary passage which is in turn arranged in a main passage forming an intake air passage.

2. Description of the related art

A known hot-wire air flow meter for an internal combustion engine, as disclosed in U.S. Pat. No. 4,887,577 has a body forming a main passage defining an intake air passage of an internal combustion engine; an auxiliary passage forming member arranged in the main passage and forming an auxiliary passage having a longitudinal passage in the axial direction of the main passage leading to transverse passages formed in the radial direction of the main passage; and a heat-sensitive resistor arranged in the longitudinal passage of the auxiliary passage for metering the flow rate of intake air. The resistor is located in a radial holder across the main passage which must necessarily be transversely thickened to accommodate the resistor across the air flow passage. So as to provide a symmetrical construction across the main passage the auxiliary passage forming member is thickened transversely across the longitudinal passage at the opposite side of the holder of the heat-sensitive resistor, as shown in FIG. 4 of the said U.S. patent, so as to provide support for the portion defining tile auxiliary passage.

JP-A-61-53518 (1986) and JP-A-64-10127 (1989) disclose the holder of the heat-sensitive resistor constructed such that a protecting member for the heat-sensitive resistor is disposed around the heat-sensitive resistor.

The member forming the auxiliary passage necessarily has its internal shape and size determined according to the air flow specification requirement of the auxiliary passage and since the outer wall forms part of the main passage, its external shape and size exert serious influences upon the air flow of the main passage. If this external shape is not correct, an increase in pressure loss occurs, and vortexes are established in the air flow. As a result, the hot-wire air flow meter output fluctuates (herein termed "output noise") which results in a decrease in accuracy of a fuel injection unit controlled thereby.

The prior art thus far described has failed to take into consideration the need for a uniform thickness and reduction in thickness of the auxiliary passage forming member but has determined tile internal and external shapes and sizes from the above-specified necessary specifications of the auxiliary passage and the main passage. As a result, the auxiliary passage forming member has tended to have a thick portion extending transversely to the main passage which causes a problem in that the product weight is increased. Even more importantly, because the body and the auxiliary passage forming member are integrally molded, if the auxiliary passage forming member is solid and relatively thick both axially and transversely of the main passage, and if it is made of a synthetic resin, a large shinkage normally occurs due to molding shrinkage, which then causes another problem in that the desired shape and size cannot be obtained resulting in decreased accuracy (see FIG. 5 described later herein). If the auxiliary passage forming member is made of a metal, such as aluminum, a similar but less serious problem arises than when synthetic resin is used.

Figure 6:
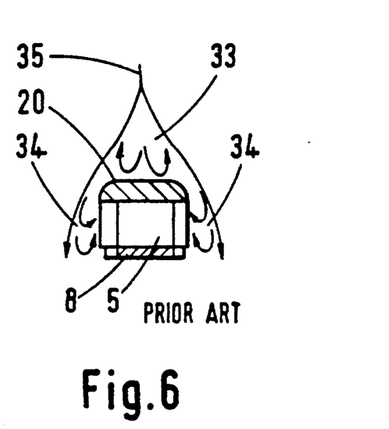

If the thickness of the auxiliary passage forming member is to be made uniform, on the other hand (as shown in FIG. 6 described later herein), the external shape is incorrect to raise a further problem in that the aforementioned pressure loss and output noise occur due to the member having a flat leading surface. Also, such a construction is not symmetrical across the main passage since the axial length of the resistor holder is greater than that of the auxiliary passage forming member.

Moreover, the prior art technologies, as disclosed in JP-A-61-53518 (1986) and JP-A-64-10127 (1989), are directed to the protecting member for the heat-sensitive resistor, and neither has the object of improving the shape and size accuracies of the auxiliary passage forming member.

The present invention seeks to overcome the foregoing disadvantages.

A first specific object of the present invention is to provide an air flow meter in which the auxiliary passage forming member has reduced wall thickness without increasing the pressure loss and the output noise.

A second specific object of the present invention is to provide an air flow meter which can not only eliminate the aforementioned thick portion but also protect the heat-sensitive resistor arranged in the auxiliary passage.

A third specific object of the present invention is to provide an air flow meter which can not only eliminate the aforementioned thick portion but also reduce the output error caused by the intake pulsations of an internal combustion engine.

A fourth specific object of the present invention is to provide an air flow meter which can not only eliminate the aforementioned thick portion but also reduce the fluctuations of the air flow in the auxiliary passage and the meter output noise.

SUMMARY OF THE INVENTION

According to this invention there is provided an air flow meter comprising: a body forming a main passage defining an intake air passage of an internal combustion engine; auxiliary passage defining means arranged in said main passage to form an auxiliary passage having a longitudinal passage in the axial direction of said main passage and at least one transverse passage in the radial direction of said main passage; said auxiliary passage defining means having a radially directed portion thereof connected to an internal wall of said main passage; and a heat-sensitive resistor arranged in said longitudinal passage of said auxiliary passage for metering the flow rate of intake air, wherein a hollow space is provided in said radially directed portion to render the wall thickness of the auxiliary passage defining means substantially uniform and said hollow space is separated from said longitudinal passage by an auxiliary member.

Advantageously, said auxiliary passage defining means is made of a synthetic resin, and conveniently, said body and said auxiliary passage defining means are integrally molded of a synthetic resin.

In a preferred embodiment said auxiliary member surrounds said heat-sensitive resistor and has an aperture therein forming part of said longitudinal passage.

Advantageously, seal means are disposed between said auxiliary member and said portion of the auxiliary passage defining means in which said hollow space is located to provide a gas-tight seal between said hollow space and said longitudinal passage.

In an embodiment of the invention there is provided a passage having a small cross-sectional area disposed in said auxiliary member to connect said hollow space with said longitudinal passage.

Alternatively, an annular passage is provided between said auxiliary member and said hollow space.

In another preferred embodiment of the invention the auxiliary member is integrally molded with the auxiliary passage defining means to form a portion of said longitudinal passage.

Preferably, said auxiliary member is formed with a flow regulating grid transversely of the auxiliary air passage upstream of said heat sensitive resistor for stabilizing the air flow through said longitudinal passage.

Advantageously, flow regulating grids are integrally formed with said auxiliary member upstream and downstream of said heat sensitive resistor.

So as to reduce capacitance problems said auxiliary member is made of an electrically conductive material.

So as to provide an integrated unit said body is integrally formed with a throttle body which houses a throttle valve for controlling the intake air flow rate of the internal combustion engine.

In order to achieve the first specific object, the present invention provides a hollow space in the auxiliary passage defining means which is substantially separated from the longitudinal auxiliary passage.

In order to achieve the second specific object, of the present invention, the hollow space is separated from the longitudinal auxiliary passage by an auxiliary member which surrounds the heat-sensitive resistor and forms part of the longitudinal passage.

In order to achieve the third specific object, the present invention provides a passage having a small cross-sectional area between the hollow space and the longitudinal passage.

In order to achieve the fourth specific object, the present invention provides the auxiliary member with an integral flow regulating grid for stabilizing the air flow through the longitudinal passage.

In this invention the auxiliary passage forming member is formed to produce a hollow space therein, and the hollow space is substantially separated from the auxiliary passage, so that the solid and thick portion of the auxiliary passage forming member required in U.S. Pat. No. 4,887,577, FIG. 4, is eliminated without influencing the shapes and sizes of the main passage and the auxiliary passage. As a result, the auxiliary passage forming member can have its weight reduced and is not so susceptible to shrinkage if made of a synthetic resin or the like.

The hollow space is separated from the longitudinal passage by the auxiliary member which surrounds the heat-sensitive resistor and forms part of tile longitudinal passage. In addition, since the heat-sensitive resistor attached to a circuit module is located in the auxiliary member, it can be prevented from being damaged at a time before the circuit module is fitted in the body forming the air passage.

In the running condition of an engine with the throttle valve opened nearly to its full stroke, the intake air is synchronized with the opening or closing operation of the engine intake valve to establish a pulsating flow. These intake pulsations are also established in the main passage of tile hot-wire air flow meter. In the auxiliary passage, tile pulsations are likewise established, although their amplitude is smaller than that of the main passage because they are damped by the auxiliary passage. These pulsations give errors to the output of the hot-wire air flow meter, as is well known in the art. By forming a passage having a small cross-sectional area to connect between the aforementioned hollow space and the auxiliary longitudinal passage, the hollow space is able to act as an air reservoir or damper to reduce the intake pulsations on the heat-sensitive resistor and, accordingly, to reduce the output errors of the hot-wire air flow meter due to the intake pulsations of the internal combustion engine. Because of tile small cross-sectional area of the passage, moreover, the accuracy is little influenced by the hollow space in the presence of a steady intake air flow.

The fluctuations of the air flow hitting the heat-sensitive resistor can be reduced to decrease the output noise by the action of a flow regulating grid which may be made integral with the auxiliary member.

BRIEF DESCRIPTION OF THE DRAWINGS

The invention will now be described, by way of example, with reference to the accompanying drawings in which.

In the Figures like reference numerals denote like parts.

DESCRIPTION OF THE PREFERRED EMBODIMENTS

Figure 1:
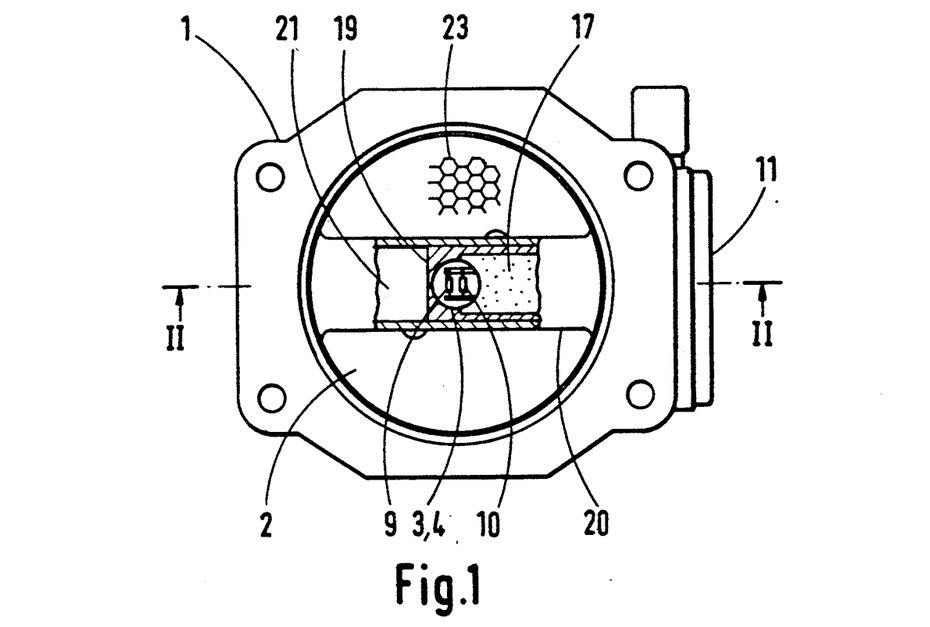
FIG. 1 shows a top plan view, partially in section, of a hot-wire air flow meter in accordance with one embodiment of the present invention.
Figure 2:
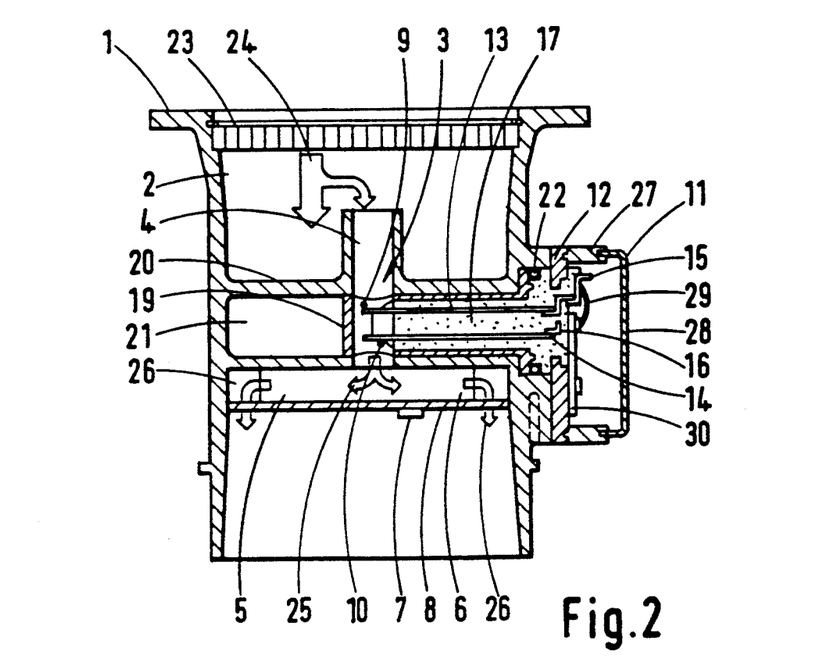
FIG. 2 shows a longitudinal cross-section taken along double arrow-headed line II—II of FIG. 1.
Figure 3:
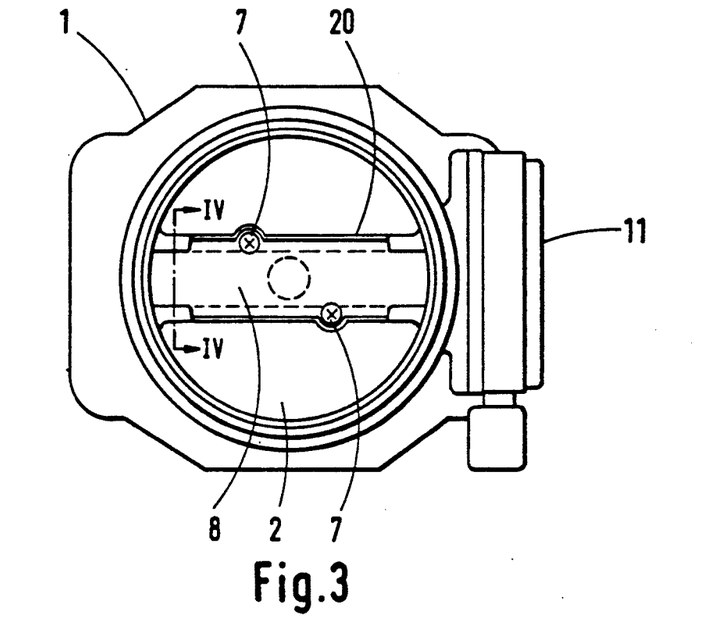
FIG. 3 shows a bottom view of the air flow meter shown in FIG. 1.

The hot-wire air flow meter shown in FIGS. 1 to 3 has a body 1 with an internal main passage 2 defining an intake air passage of an internal combustion engine. Inside the main passage 2 is an auxiliary passage forming member 20. The auxiliary passage forming member 20 has an auxiliary passage 3 which is composed of a longitudinal passage 4 formed in the axial direction of the main passage 2 and transverse passages 5 and 6 formed in the radial direction of the main passage 2. The transverse passages 5 and 6 have their downstream wall formed by a cover 8 which is attached to the body 1 by screws 7.

In the longitudinal passage 4, there are arranged a heat-sensitive resistor 9 for metering the flow rate of air and a heat-sensitive resistor 10 for measuring the air temperature, although it is to be understood only one heat sensitive resistor :is required but two are preferred for improved accuracy. The resistors may be of a so-called hot-wire type or may be of thin film.

Screwed onto the outside of the body 1, there is a circuit module 11 for controlling the air flow meter.

The hot-wire air flow meter of the present embodiment meters the flow rate of intake air of the internal combustion engine by supplying a heating current to the heat-sensitive resistor 9, the value of which current is varied to control the temperature of the heat-sensitive resistor 9 to be a substantially higher constant level than that of the heat-sensitive resistor 10. The velocity of the air flow hitting the heat-sensitive resistor 9 in the auxiliary passage 3 is determined from the value of the heating current which is thus indicative of the flow rate of the intake air of the main passage 2, since the air flow rate in the auxiliary passage 3 has a constant relation to the flow rate in the main passage 2.

The circuit module 11 has a base 12 made of a metal, support pins 13 and 14 made of electric conductors for the heat-sensitive resistors 9 and 10; a synthetic resin holder 17 molded integrally with terminals 15 and 16 welded to the support pins 13 and 14; a housing 27 and a cover 28 defining a casing; and a control circuit unit 30 connected with the terminals 15 and 16 through an aluminum wire 29.

The heat-sensitive resistors 9 and 10 are welded to the support pins 13 and 14, respectively.

Externally of that portion of the synthetic resin holder 17 which is ill the body 1, there is attached a protector 19 with a radially inner end thereof surrounding the heat-sensitive resistors 9 and 10 to form an auxiliary member which defines part of the longitudinal passage 4 of the auxiliary passage forming member 20. The protector 19 is adhered to the holder 17.

The auxiliary passage forming member 20 of the body 1 is provided with a tubular portion of substantially uniform wall thickness radially extending from the inner wall of the body 1 to define a circularly cross-sectioned hole 21 which is closed at its radially inner end by insertion of the radially inner, leading end, portion of the protector 19 acting as the aforementioned auxiliary member. Thus, the leading end (radial inner end) portion of the protector 19 has an aperture substantially the same shape and size as that of the internal diameter of the longitudinal passage 4 to form part of the longitudinal passage 4.

The body 1 is integrally molded with the auxiliary passage, using a thermoplastic resin such as a polyester resin mixed with a reinforcing material such as glass fibers or the like. The hole 21 is integrally formed at the time of molding the body 1 by extracting a molding pin in the direction of the mounting face of the circuit module 11.

On the outer circumference of the holder 17, there is fitted an O-ring 22 for ensuring a gas tight fit between the body 1 and the circuit module 11.

An air flow honeycomb regulating grid 23 is fitted in the entrance of the main passage 2 of the body 1 to smooth out the air flow, i.e. remove disturbances in the main passage 2.

The intake air introduced into the entrance of the main passage 2 is partially shunted into the longitudinal passage 4, as indicated by arrows 24, and thence into the transverse passages 5 and 6, as indicated by arrows 25, until it is returned to the main passage through apertures in the walls defining tile transverse passages 5 and 6, as indicated by arrows 26.

Next, the operation of the present embodiment will be described in detail.

Figure 5:
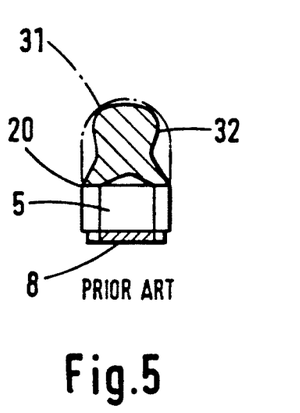
FIGS. 5 and 6 are views corresponding to FIG. 4, but showing the prior art cross-sections.

In the prior art, as shown in FIG. 5 the auxiliary passage forming member 20 is a solid member across the longitudinal passage 4 symmetrical with and at the side opposed to the holder 17. As a result, the required shape and size cannot be sustained due to uneven wall thickness causing uneven shrinkage at the time of molding, as indicated by solid line 32, even if the mold shape and size is made to conform to the required shape and size, as indicated by tile chain broken line 31. The thickened portion also raises a problem of increased weight. If, as is also known in the prior art, and as shown in FIG. 6, the walls of the auxiliary passage forming member 20 are uniform, the shape and size of the leading side (that is, at the side of the main passage 2) of the auxiliary passage forming member 20 is flat, not rounded as in FIG. 5 and it has a greater width across tile main passage than depth longitudinally along the main passage so is not symmetrical with the holder 17, many vortexes 33 and 34 are established on the upstream and side faces of the auxiliary passage forming member 20 by the air flow 35 which flows in the main passage 2 hitting the upstream face of the auxiliary passage forming member 20. These vortexes 33 and 34 reduce the effective area of the main passage 2 to cause the problem of increasing the pressure loss. Still worse, the vortexes establish pressure fluctuations in the exit of the transverse passage 5 so that fluctuations in the flow velocity of the auxiliary passage 3 are induced to augment the output noise.

Figure 4:
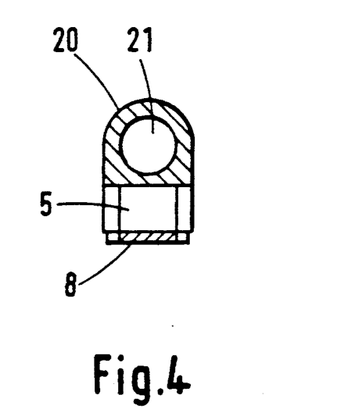
FIG. 4 shows a cross-section taken along double arrow-headed line IV—IV of FIG. 3.

In the present invent i on, on tile contrary, the auxiliary passage forming member 20 is not solid due to the hole 21 formed therein, so the walls are more uniform in thickness and the shape and size of the auxiliary passage forming member 20 at the side of the main passage 2 is optimized for performance. Thus, there arises the effect that the desired shape and size can be achieved. Another effect is that the weight can be reduced to an extent corresponding to the volume of tile hole 21.

A further effect is that the protector 19 in combination with holder 17 can form a sub-assembly which prevents the heat-sensitive resistor 9 from being damaged prior to insertion into the orifice formed by the forementioned molding pin.

Figure 7:
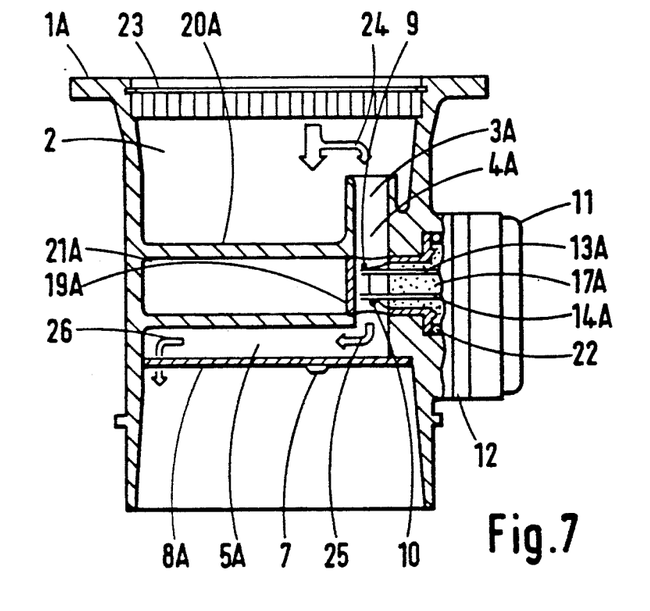
FIG. 7 shows a longitudinal section similar to FIG. 2 but of a hot-wire air flow meter in accordance with another embodiment of the present invention.

FIG. 7 shows another embodiment of the present invention, in which tile same members as those of the embodiment shown in FIGS. 1 to 3 are designated with the reference numerals whereas the corresponding members which have their shapes and sizes changed are designated by the same reference numeral but with a suffix A.

The difference in the FIG. 7 embodiment from that shown in FIGS. 1 to 3 is in that the longitudinal passage 4 of the latter has its entrance located generally at the center of tile main passage 2 and in that the transverse passage is branched into two transverse passages 4 and 5. In the embodiment of FIG. 7, on the contrary, a longitudinal passage 4A has its entrance offset from the center of the main passage 2, and only one transverse passage 5A is formed. The remaining structure is identical so that the same operations and effects as those of the embodiment of FIG. 1 are likewise obtained.

Figure 8:
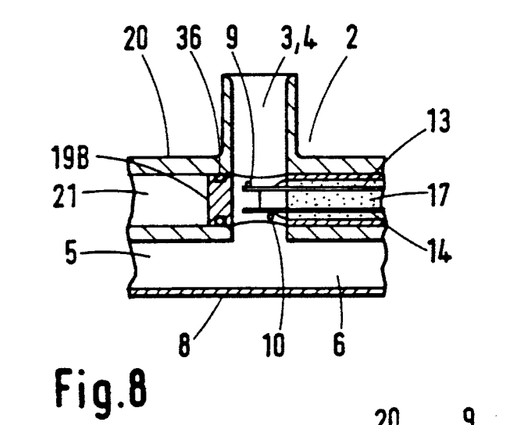
FIGS. 8 to 11 show longitudinal cross-sections of an auxiliary passage portion of the hot-wire air flow meter in accordance with other embodiments of the present invention.

FIG. 8 shows still another embodiment of the present invention. In this embodiment, the end portion of a protector 19B, which locates in tile hole 21, is formed with an external circumferential groove, in which an O-ring 36 is fitted to improve the gas tightness between the hole 21 and the longitudinal passage 4. In this embodiment, the influences of the hole 21 upon the air flow in the auxiliary passage 3 can be eliminated to improve the metering accuracy, especially in a low flow rate range.

Figure 9:
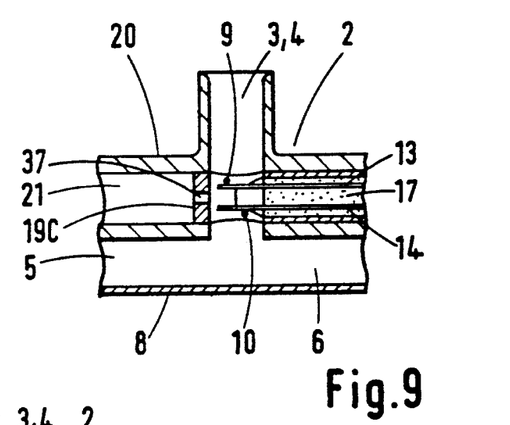

FIG. 9 shows a further embodiment of the present invention. The fitting portion of the protector 19C in the hole 21 is formed with a hole 37 having a small cross-sectional area through which the hole 21 is connected to the longitudinal passage 4 in the vicinity of the heat-sensitive resistor 9.

In the embodiment of FIG. 9, the hole 21 connected through the small hole 37 acts as an air reservoir or a damper upon the air flow pulsations of the longitudinal passage 4 due to tile intake pulsations of the internal combustion engine so that it can reduce the pulsations of the air flow that contact the heat-sensitive resistor 9. As a result, output error of the hot-wire air flow meter due to the intake pulsations of the internal combustion engine is reduced. Since, moreover, the hole 37 has a small effective cross-sectioned area, the hole 21 and the hole 37 exert few influences upon the meter output accuracy when there is a steady air flow.

Figure 10:
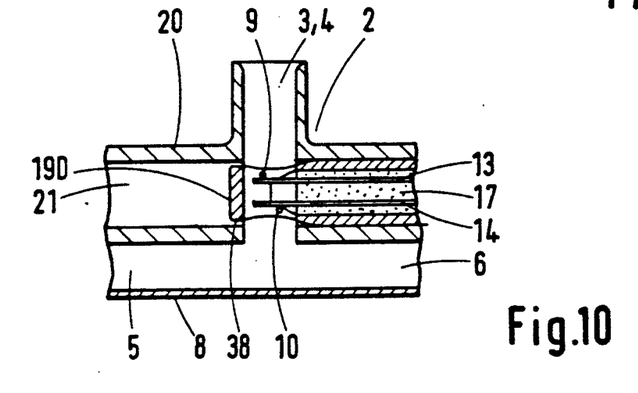

FIG. 10 shows a further embodiment of the present invention, in which tile fitting portion of the protector 19D in the hole 21 is given a smaller external diameter than the internal diameter of the hole 21 to leave an annular clearance 38 so that the same effects as those of the embodiment of FIG. 9 may be obtained.

Figure 11:
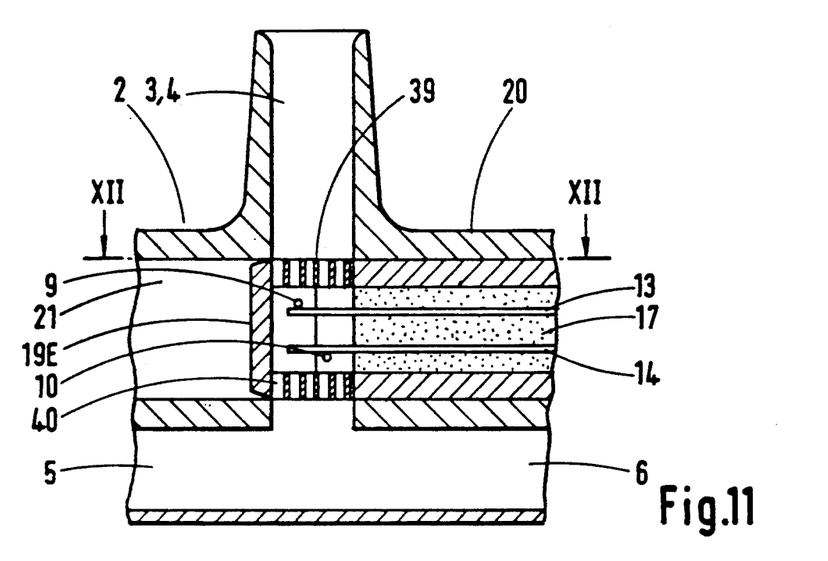
Figure 12:
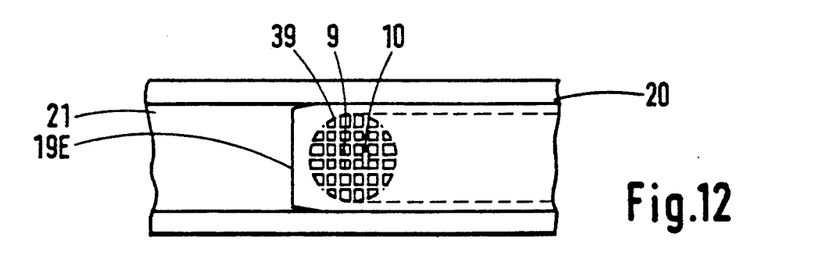
FIG. 12 shows a cross-section taken along double arrow-headed line XII—XII of FIG. 11.

FIGS. 11 and 12 show a further embodiment of the present invention, in which a protector 19E is preferably integral with honeycomb flow regulating grids 39 and 40. By such an expedient, the disturbances of the air flow in the auxiliary passage 3 can be stabilized by the air regulating grids 39 and 40 to feed the heat-sensitive resistor 9 with an air flow having few disturbances. As a result, the outpost noise can be reduced. In such an embodiment, the flow regulating grids are disposed upstream and downstream of the heat-sensitive resistor 9. However, it is possible for only one, upstream, flow regulating grid to be used, although the effect of reducing the output noise may be reduced. A grid or grids located in the auxiliary passage are much smaller than a grid in the main passage and have a similar desired effect but at lower cost due to their small size relative to a grid in the main passage.

Figure 13:
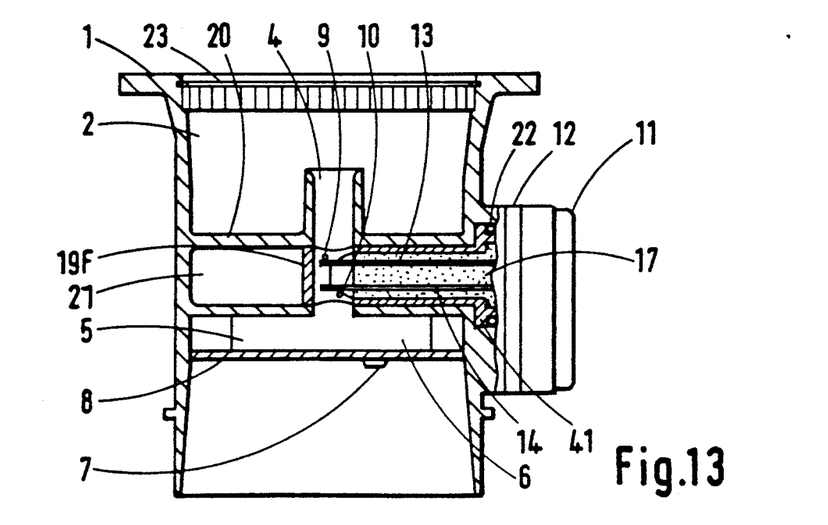
FIG. 13 shows a longitudinal cross-section corresponding to FIG. 2 but of a hot-wire air flow meter according to a further embodiment of the present invention.

FIG. 13 shows another embodiment of the present invention, in which a protector 19F is made of an electric conductor such as a metal or a conductive synthetic resin and has its radially outer end portion 41 connected electrically with the base 12 which is also made of an electric conductor. Here, the conductive synthetic resin of the protector 19F is molded by mixing metal powder or metal fibers into a synthetic resin. By such an expedient, the base 12 is electrically connected in respect of high frequencies with the ground potential portion of the control circuit unit 30 (as shown in FIG. 2) which is accommodated in the circuit module 11. Also, because the protector 19F is made of an electric conductor which covers the heat-sensitive resistor 9, so the heat-sensitive resistor 9 is shielded from external electric noise such as electric waves. As a result, the hot-wire air flow meter can be prevented from being erroneously operated by electric noise external of the meter.

Figure 14:
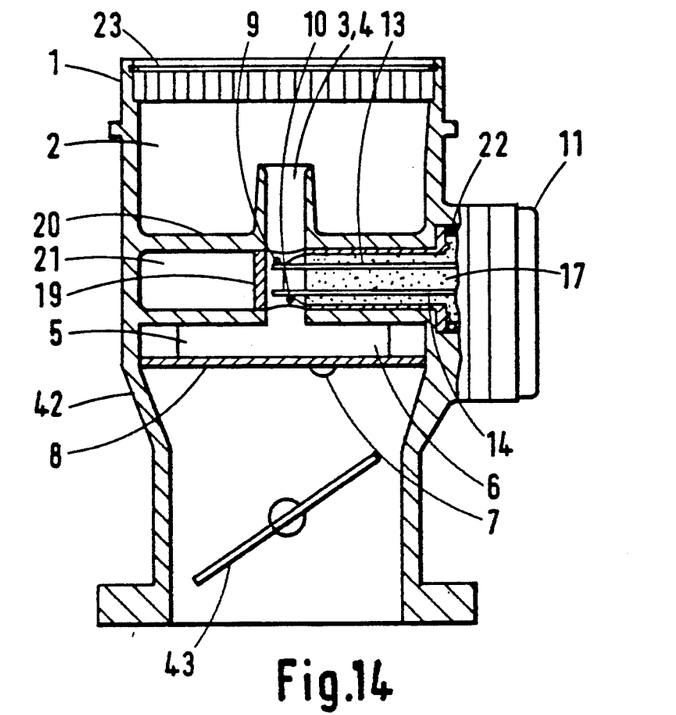
FIG. 14 shows a longitudinal cross-section showing an embodiment in which the hot-wire air flow meter of FIG. 2 is integrated with a throttle body.

FIG. 14 shows yet another embodiment of the present invention, in which the hot-wire air flow meter of FIGS. 1 to 3 is integrated with a throttle body 42 equipped with a throttle valve 43 for controlling the flow rate of the intake air of the internal combustion engine. The remaining structure is identical to that of the embodiment of FIGS. 1 to 3. Such an embodiment attains the additional effect that the intake system can be made light and compact. The body 1 of the hot-wire air flow meter and the throttle body 42 are made of one part in the embodiment shown in FIG. 14 but may be made of different parts and integrated by means of, for example, screws.

Figure 15:
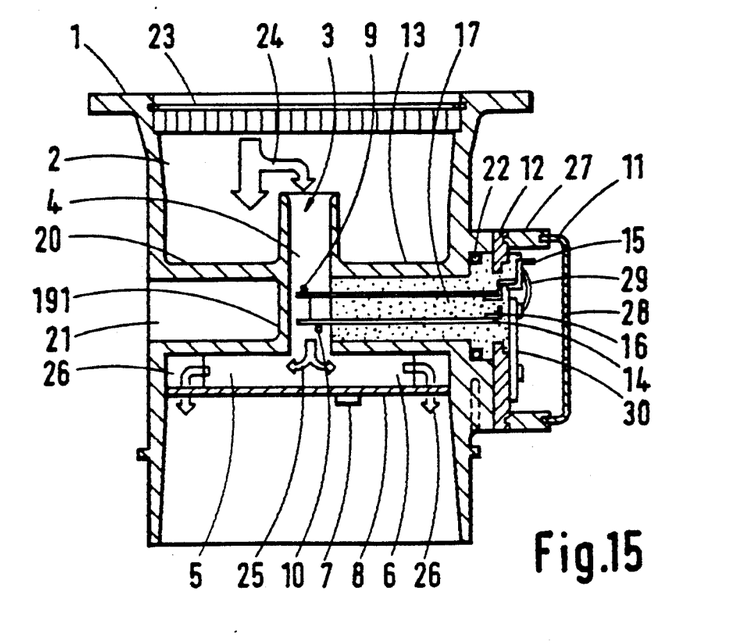
FIG. 15 shows a longitudinal cross-section of yet another embodiment of the invention.

In the yet further embodiment of FIG. 15, the holder 17 is as in the prior art and does not have a protector 19 shrouding the resistors 9, 10 so does not protect the resistors when sub-assembled. The hole 21, instead of being formed from the circuit module side of the body, is formed from the opposite side thereof and a radially inner closure is formed by integral wall, auxiliary member 191. The hole may have an outer cover (not shown) to prevent ingress of water. Such a construction, although not providing protection for the resistors 9, 10, has the advantage of avoiding the use of protector 19 whilst enabling the auxiliary passage defining means to have approximately uniform wall thickness.

In the embodiments thus far described, the auxiliary passage is molded integrally with the body 1 but it may, alternatively, be made separate from the body and fitted in the body 1.

Furthermore, although two heat sensitive resistors are preferred, which may be of wire or thin film, only one heat sensitive resistor is necessary for operation of the meter.

Since the present invention is constructed as described hereinbefore, it can achieve the following effects.

Since a space is formed in the auxiliary passage forming member which is separated from the auxiliary passage, the auxiliary passage forming member can be made having a substantially uniform wall thickness without influencing the shapes of the main passage and the auxiliary passage. As a result, the auxiliary passage forming member can have its weight reduced and can be made in the desired shape and size, even if made of a synthetic resin.

Since, moreover, the auxiliary member 19 arranged around the outer circumference of the heat-sensitive resistor separates the space formed in the auxiliary passage forming member from the auxiliary passage and forms part of the auxiliary passage, the heat-sensitive resistor is shrouded and is prevented from being hit and damaged prior to insertion into the meter.

If the aforementioned separating portion formed by the auxiliary member is provided with a passage having a small cross-sectional area, the aforementioned space can act as a damper to reduce the pulsations of the intake air in the region of the heat-sensitive resistor and, accordingly, the output errors of the hot-wire air flow meter due to the pulsations of the intake air of the internal combustion engine are reduced.

Also, if the flow regulating grid is integrated with the auxiliary member, it acts to reduce the fluctuations of the air flow contacting the heat-sensitive resistor, thereby reducing the output noise.

It is to be understood that the invention has been described with reference to exemplary embodiments, and mofications may be made without departing from the spirit and scope of the invention as defined ill the appended claims.

We claim:

1. An air flow meter comprising: a body forming a main passage defining an intake air passage of an internal combustion engine; auxiliary passage defining means unitarily molded with said body and arranged in said main passage to form an auxiliary passage having a longitudinal passage in the axial direction of said main passage and at least two transverse passages in the radial direction of said main passage; said auxiliary passage defining means having radially directed portions thereof defining said transverse passages respectively connected to an internal wall of said main passage; a heat-sensitive resistor arranged in said longitudinal passage of said auxiliary passage for metering the flow rate of intake air; said heat sensitive resistor being connected to a holder in only one of said transverse passages; and another of said transverse passages having a hollow space therein, the wall thickness of the auxiliary passage defining means being rendered substantially uniform, said hollow space being separated from said longitudinal passage by an auxiliary member forming part of said auxiliary passage defining means.

2. An air flow meter according to claim 1, wherein said auxiliary passage defining means is made of a synthetic resin.

3. An air flow meter according to claim 1, wherein said body and said auxiliary passage defining means are integrally molded of a synthetic resin.

4. An air flow meter according to claim 1 wherein said auxiliary member substantially surrounds said heat-sensitive resistor and has an aperture therein forming part of said longitudinal passage.

5. An air flow meter according to claim 1, wherein seal means are disposed between said auxiliary member and said portion of the auxiliary passage defining means in which said hollow space is located to provide a gas-tight seal between said hollow space and said longitudinal passage.

6. An air flow meter according to claim 1, wherein a hole having a small cross-sectional area is disposed in said auxiliary member to connect said hollow space with said longitudinal passage.

7. An air flow meter according to claim 1 wherein an annular passage is provided between said auxiliary member and said radially directed portion defining said other transverse passage having said hollow space therein.

8. An air flow meter according to claim 1 wherein the auxiliary member is integrally molded with the auxiliary passage defining means to form a portion of said longitudinal passage.

9. An air flow meter according to claim 1, wherein said auxiliary member is formed with a flow regulating grid transversely of the auxiliary air passage upstream of said heat sensitive resistor for stabilizing the air flow through said longitudinal passage.

10. An air flow meter according to claim 1 wherein flow regulating grids are integrally formed with said auxiliary member upstream and downstream of said heat sensitive resistor.

11. An air flow meter according to claim 1 wherein said auxiliary member is made of an electrically conductive material.

12. An air flow meter according to claim 1, wherein said body is integrally formed with a throttle body which houses a throttle valve for controlling the intake air flow rate of the internal combustion engine.

* * * * *